(12) United States Patent
Schoon et al.

(10) Patent No.: US 12,728,911 B2
(45) Date of Patent: Sep. 8, 2026

(54) STEERING SYSTEM

(71) Applicant: ZF Active Safety US Inc., Livonia, MI (US)

(72) Inventors: Benjamin Schoon, Livonia, MI (US); Kevin Boyle, Livonia, MI (US); Zach Volmering, Livonia, MI (US); Caleb Crum, Livonia, MI (US)

(73) Assignees: ZF ACTIVE SAFETY US INC., Livonia, MI (US); ZF ACTIVE SAFETY AND ELECTRONICS US LLC, Livonia, MI (US)

( * ) Notice: Subject to any disclaimer, the term of this patent is extended or adjusted under 35 U.S.C. 154(b) by 628 days.

(21) Appl. No.: 18/307,851

(22) Filed: Apr. 27, 2023

(65) Prior Publication Data

US 2024/0359727 A1 Oct. 31, 2024

(51) Int. Cl.
*B62D 5/04* (2006.01)

(52) U.S. Cl.
CPC ......... *B62D 5/0448* (2013.01); *B62D 5/0403* (2013.01)

(58) Field of Classification Search
CPC ............................ B62D 5/0448; B62D 5/0403
USPC .................................................. 180/443, 444
See application file for complete search history.

(56) References Cited

U.S. PATENT DOCUMENTS 5,890,394 A 4/1999 Anderson
2017/0152926 A1* 6/2017 Ikeda .................. F16H 25/2015

FOREIGN PATENT DOCUMENTS

CN 105026190 A * 11/2015 .............. F16F 1/185
DE 4207668 A1 * 9/1993 ............... B62D 5/08
DE 102011119161 A1 5/2013
EP 3315385 B1 6/2019
JP 2014088920 A 5/2014
JP 2023043475 A * 3/2023
JP 2023046772 A * 4/2023 ......... F16H 25/2015
WO 2019/059355 A1 3/2019

OTHER PUBLICATIONS

PCT Search Report and Written Opinion for corresponding International Application Serial No. PCT/IB2024/053946, dated Jul. 12, 2024, pp. 1-38.

* cited by examiner

*Primary Examiner* — Jacob D Knutson
(74) *Attorney, Agent, or Firm* — Tarolli, Sundheim, Covell & Tummino LLP

(57) ABSTRACT

A steering system is provided. The steering system includes a housing and a ball shaft translatable relative to the housing. A ball nut is rotatably mounted within the housing. Rotation of the ball nut responsively causes the ball shaft to translate relative to the ball nut and the housing. The ball shaft has an opening extending therethrough. A pin is separate from the ball shaft and inserted into the opening. The pin engages the housing to limit rotation of the ball shaft relative to the housing.

20 Claims, 11 Drawing Sheets

269
236
237
234
268
235
SA 262
266
266
264
260
266
266
262

283
282
291
291
289
285
282
231

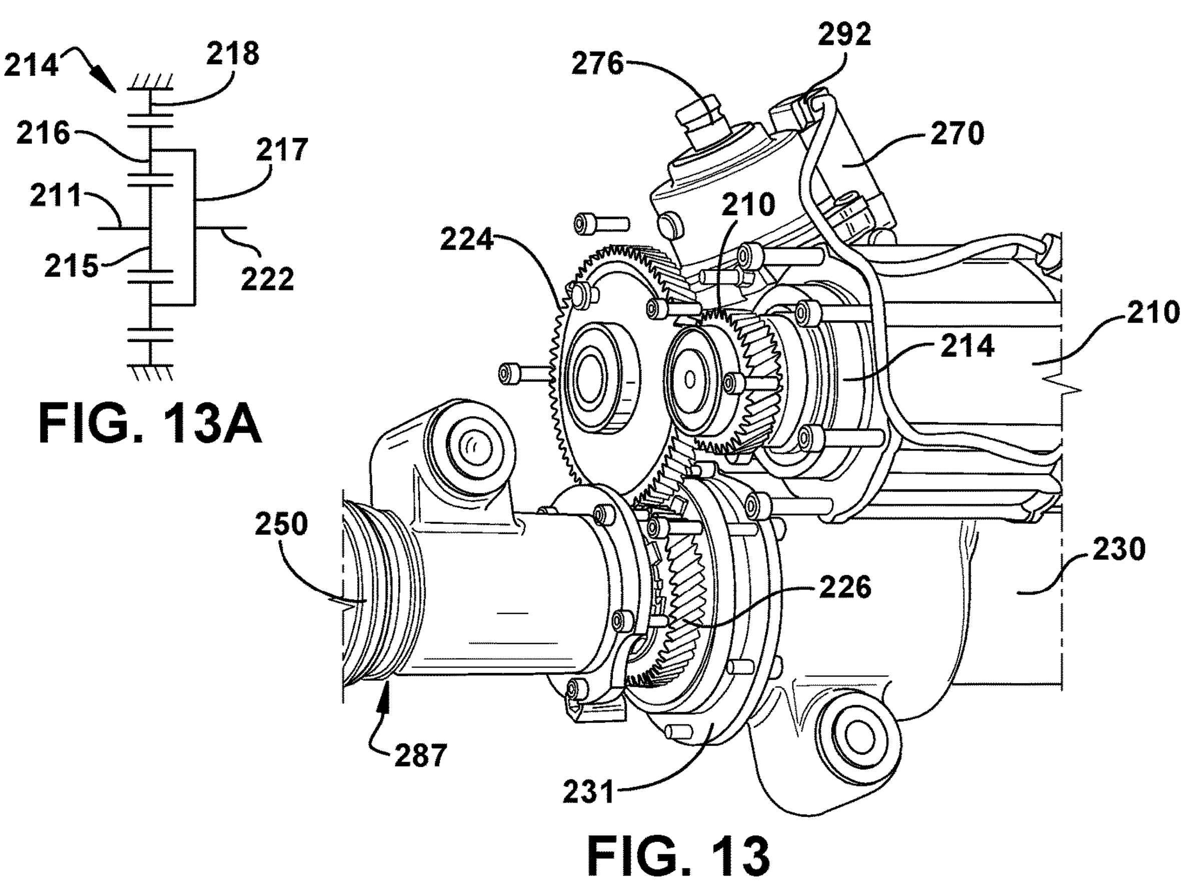
FIG. 13A
FIG. 13
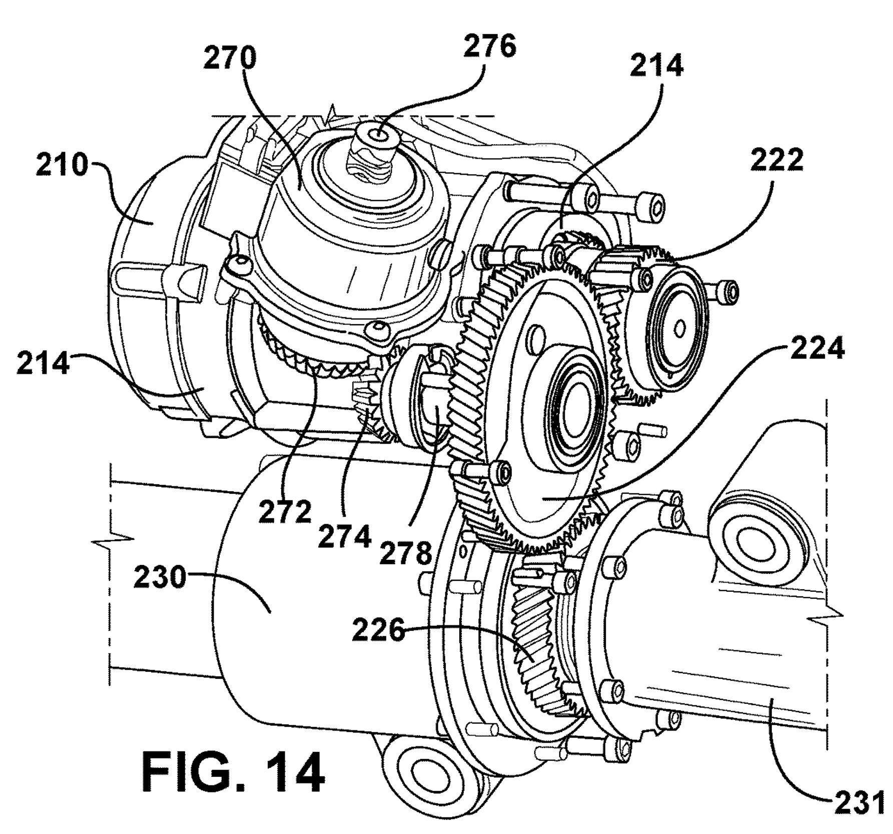
FIG. 14

STEERING SYSTEM

FIELD OF THE INVENTION

In one aspect, the present invention relates generally to a steering system for a vehicle.

BACKGROUND OF THE INVENTION

Conventional commercial vehicles include rack-and-pinon architecture in which a steering wheel is operably connected to a steering rack via a pinion meshingly engaged to the steering rack. To supplement the force applied to the steering rack by the driver turning the steering wheel, these same conventional commercial vehicles generally include hydraulic power steering systems. Known hydraulic power steering systems include a hydraulic piston actuated by pressurized hydraulic fluid from a pump. The hydraulic piston is also coupled to a steering rack so that the pressurized hydraulic fluid from the pump selectively extends and retracts the hydraulic piston to supplement the driver applied force.

While known hydraulic power steering systems function well in conventional commercial vehicles, utilizing hydraulic power steering in electric and/or hybrid commercial vehicles poses challenges. Therefore, there has been a push to develop electric power steering systems for commercial vehicles.

However, implementing an electric power steering system into a commercial vehicle presents its own challenges. For example, the implementation of an electric power steering system in a commercial vehicle may result in the omittance of the pinion. Without the pinion, forces imparted onto the steering rack via the driver and/or from a motor of the electric power steering system may cause the steering rack to undesirably rotate relative to the housing.

SUMMARY OF THE INVENTION

Aspects and advantages of the invention will be set forth in part in the following description, or may be apparent from the description, or may be learned through practice of the invention.

According to an aspect of the invention, alone or in combination with any other aspect, a steering system is comprises a housing and a ball shaft translatable relative to the housing. The ball shaft has an opening extending therethrough. A ball nut is rotatably mounted within the housing. Rotation of the ball nut responsively causes the ball shaft to translate relative to the ball nut and the housing. A pin is separate from the ball shaft and inserted into the opening. The pin engages the housing to limit rotation of the ball shaft relative to the housing.

According to an aspect of the invention, alone or in combination with any other aspect, a steering system comprises a housing defining a slot. A ball shaft is translatable relative to the housing. A ball nut rotatably mounted within the housing. Rotation of the ball nut responsively causes the ball shaft to translate relative to the ball nut and the housing. A pin is separate from and joined to the ball shaft. The pin projects into the slot to limit rotation of the ball shaft relative to the housing.

BRIEF DESCRIPTION OF THE DRAWINGS

The foregoing and other features of the invention will become apparent to one skilled in the art to which the invention relates upon consideration of the following description of the invention with reference to the accompanying drawings, in which:

FIG. 13 is a perspective view of a gearset of the steering system of FIG. 2;

FIG. 13A is a schematic view of a planetary gear set of the steering system of FIG. 2; and FIG. 14 is a perspective view of a gearset of the steering system of FIG. 2.

DETAILED DESCRIPTION OF THE INVENTION

Figure 1:
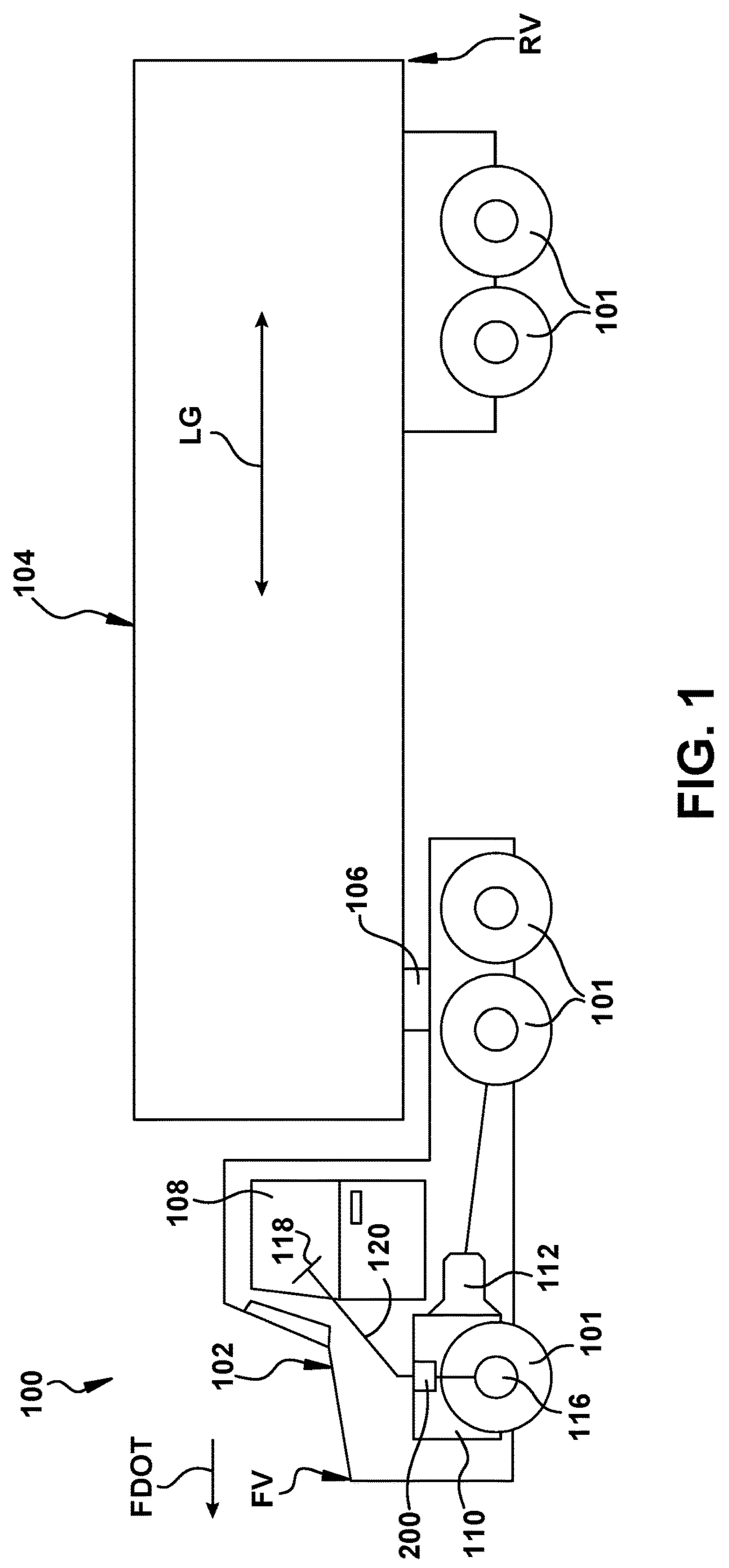
FIG. 1 is a schematic illustration of a vehicle according to an example embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the terms "comprises" and "comprising." Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified.

Example embodiments of the present disclosure are directed to an electric power steering system for heavy commercial vehicles. The electric power steering system may include a ball-screw assembly. Utilizing the ball-screw assembly may advantageously provide a mechanical advantage between an electric motor and/or a vehicle handwheel and steering knuckles of the commercial vehicle. Moreover, the electric power steering system may provide a mechanically robust, relatively safe, and cost-effective power steering system for heavy commercial vehicles.

FIG. 1 illustrates a side, elevation view of a vehicle 100. As shown in FIG. 1, the vehicle 100 includes a tractor 102, a trailer 104 and is generally referred to as a "tractor-trailer truck." As an example, the vehicle 100 may be a Class 8 commercial vehicle based on a gross vehicle weight rating. The vehicle 100 is provided as an example only. For instance, the vehicle 100 may include one, two, or more additional trailers in alternative example embodiments. In addition, while described below in the context of the vehicle 100, it will be understood that the present subject matter may be used in or with any other suitable vehicle, including passenger vehicles, such as cars, vans, trucks, etc., or commercial vehicles, such as buses, box trucks, farm vehicles, construction vehicles, etc., in other example embodiments.

The vehicle 100 may define a longitudinal direction LG. A front portion FV of vehicle 100 and a rear portion RV of the vehicle 100 may be spaced apart from each other along the longitudinal direction LG. Thus, the vehicle 100 may extend between the front and rear portions FV, RV of the vehicle 100 along the longitudinal direction LG. Front portion FV of the vehicle 100 may be positioned forward of rear portion RV of the vehicle 100 along a forward direction of travel FDOT. The tractor 102 may be positioned at the front portion FV of the vehicle 100.

The tractor 102 may be pivotally connected to the trailer 104 via a hitch 106 and operative to tow the trailer 104. Various items for transport may be stored within the trailer 104. In alternative example embodiments, the trailer 104 may be open, e.g., a flat bed, depending on items stored on the trailer 104. The tractor 102 may include various components for towing the trailer 104, including a motor system 110, a transmission system 112, a steering system 200, a braking system 116, etc. A driver may sit within a cab 108 of the tractor 102 during operation.

In general, the motor system 110, the transmission system 112 and the braking system 116 may be configured in any conventional manner. For example, the motor system 110 may generally include a suitable prime mover, such as an electric motor and/or internal combustion engine, that is operative to propel the vehicle 100. The motor system 110 may be disposed within the tractor 102 and may be connected to the transmission system 112. The transmission system 112 is disposed within power flow between the motor system 110 and wheels 101 of the vehicle 100. The transmission system 112 is operative to provide various speed and torque ratios between an input and output of the transmission system 112. Thus, e.g., the transmission system 112 may provide a mechanical advantage to assist propulsion of the vehicle 100 by the motor system 110. The braking system 116 is operable to decelerate the vehicle 100. For instance, the braking system 116 may include friction brakes configured to selectively reduce the rotational velocity of the wheels 101. The braking system 116 may also be configured to as a regenerative braking system that converts kinetic energy of the wheels 101 into electric current. Operation of the motor system 110, the transmission system 112 and the braking system 116 is well known to those skilled in the art and not described in extensive detail herein for the sake of brevity.

Figure 2:
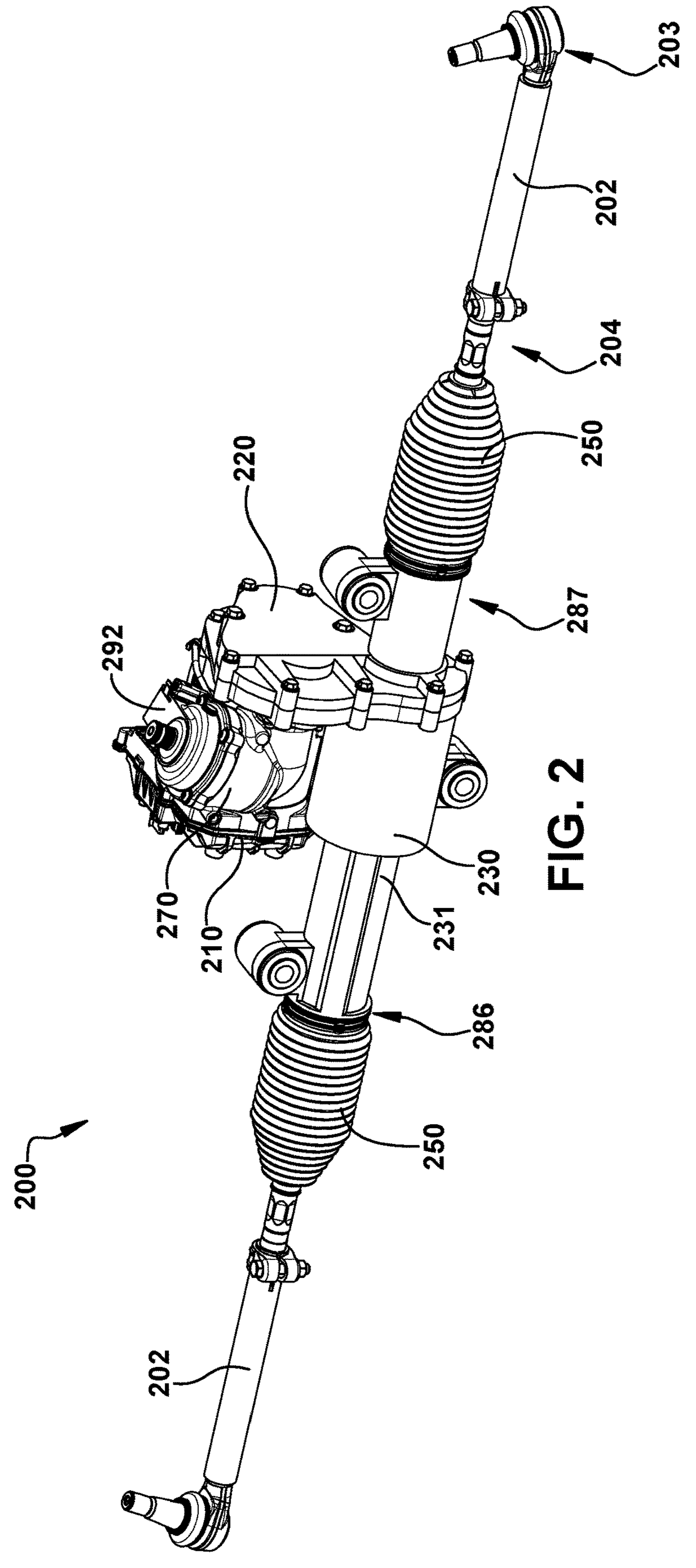
FIG. 2 is a perspective view of a steering system according to an example embodiment of the present disclosure.

The steering system 200 is operable to adjust the direction of travel of the vehicle 100. For instance, the steering system 200 may be coupled to the front wheels 101 of the vehicle 100 and be operatable to turn the front wheels 101 in response to a driver of commercial vehicle turning a steering device 118 (e.g., a steering wheel) within the cab 108 and/or operation of a prime mover (e.g., electric motor 210) within the steering system 200. Thus, in general, the steering wheel 118 may be connected to the steering system 200 by a steering column 120 that extends between and couples the steering wheel 118 and the steering system 200 such that rotation of the steering wheel 118 causes rotation of the steering column 120 and translation of a shaft (e.g., ball shaft 234) of the steering system 200, which changes a heading angle of the front wheels 101 relative to a forward direction of travel FDOT. The electric motor 210 may be configured to apply a torque to assist the driver in rotating the steering column 120. For instance, the amount of torque applied by the electric motor 210 may be varied based on a speed of the vehicle 100. The total force or torque acting on the steering column 120 (e.g., by a driver and/or the electric motor 210) may be measured using one or more shaft sensors 292 (FIG. 2). The shaft sensor(s) 292 may include a transducer(s) configured to output an electrical signal proportional to the dynamic or rotary torque applied to the steering column 120. Alternatively, or additionally, the shaft sensor(s) 292 may include angular position sensors for detecting the angular position of the steering column 120, where the angular position of the steering column 120 (e.g., from a neutral position) is indicative of the torque acting on the steering column 120.

FIG. 2 is a perspective view of an electric power steering system 200 according to an example embodiment of the present disclosure. The electric power steering system 200 may be mounted within the vehicle 100, e.g., on a frame of the vehicle 100. Thus, the electric power steering system 200 is described in greater detail below in the context of the vehicle 100 of FIG. 1. However, it will be understood that the electric power steering system 200 may be used in or with any other suitable vehicle, including passenger vehicles, such as cars, vans, trucks, etc., or commercial vehicles, such as buses, box trucks, farm vehicles, construction vehicles, etc., in other example embodiments. In general, the electric power steering system 200 may be configured for use in or with commercial vehicles sized greater than twenty-six thousand pounds (26,000 lbs.), greater than seven and a half tons (7.5 t), or other heavy trucks.

As discussed in greater detail below, the electric power steering system 200 includes components for providing a mechanical advantage for an electric motor, e.g., to allow the electric motor to supplement torque applied to a steering linkage by a driver turning a steering wheel. The electric power steering system 200 may also have numerous advantages over hydraulic power steering systems. For instance, the electric power steering system 200 may allow for implantation of automatic driver assist features, such as lane keeping, lane departure corrections, and autonomous driving. In addition, the electric power steering system 200 may only consume power while in use. In contrast, hydraulic power steering systems require a pump that runs continuously with the prime mover, internal combustion engine.

Figure 3:
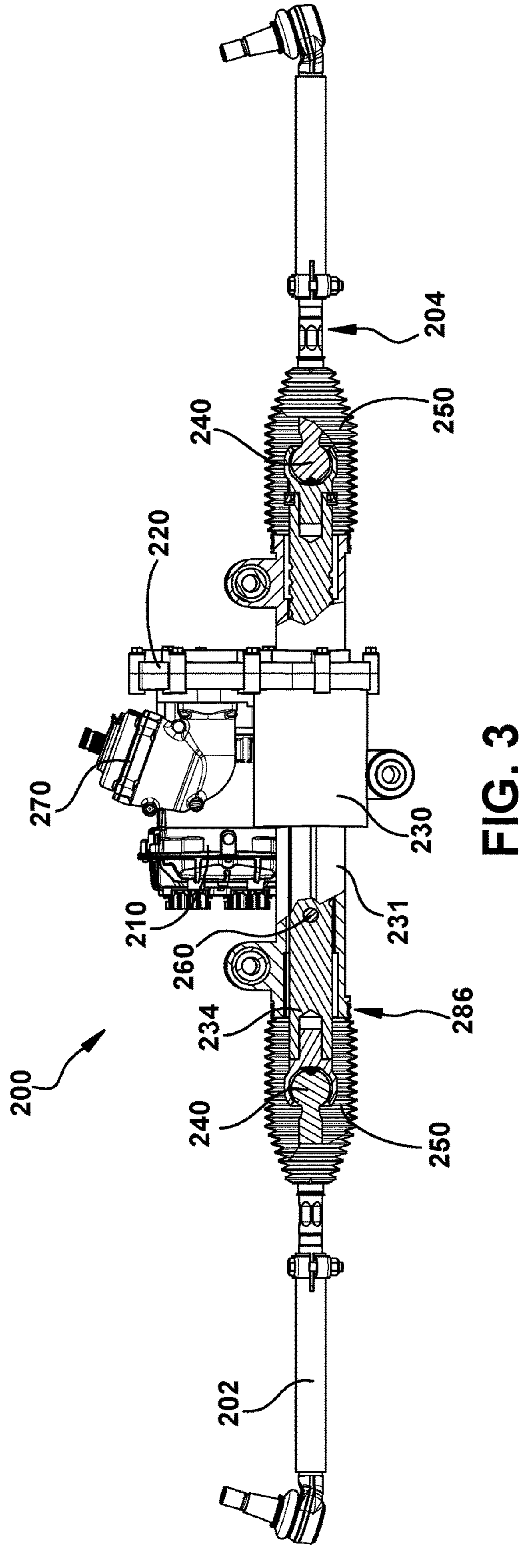
FIG. 3 is a side, partial section view of the steering system of FIG. 2.

Various views and components of the electric power steering system 200 are also shown in FIGS. 2-8. Turning now to FIGS. 2-3, the electric power steering system 200 may include an electric motor 210, a gearset 220 and a ball-screw assembly 230. The electric motor 210 may be coupled to the ball-screw assembly 230 via the gearset 220. Thus, e.g., rotary motion of the electric motor 210 may be transmitted to the ball-screw assembly 230 via the gearset 220. Moreover, the ball-screw assembly 230 may convert the rotary motion of the electric motor 210 to translate tie rods 202. Each tie rod 202 may extend between and connect a ball shaft 234 (FIG. 3) of the ball-screw assembly 230 to a respective knuckle (not shown) of the vehicle 100. In particular, an outer end 203 of each tie rod 202 may be mounted to a steering arm of the respective knuckle, and an inner end 204 of each tie rod 202 may be connected to the ball shaft 234. Translation of the ball shaft 234 may thus rotate knuckles via the tie rods 202 and turn the front wheels 101 of the vehicle 100.

The electric power steering system 200 may be configured for installation within vehicles with an independent front suspension. Thus, the electric power steering system 200 may include a pair of ball joints 240. The ball joints 240 may assist with allowing pivoting of the tie rods 202 relative to the ball-screw assembly 230, which may be mounted on a frame of the vehicle 100. Moreover, when the front wheels 101 move relative to the frame and the ball-screw assembly 230 on the front suspension, the ball joints 240 may permit the tie rods 202 to pivot relative to the ball-screw assembly 230.

Figure 5:
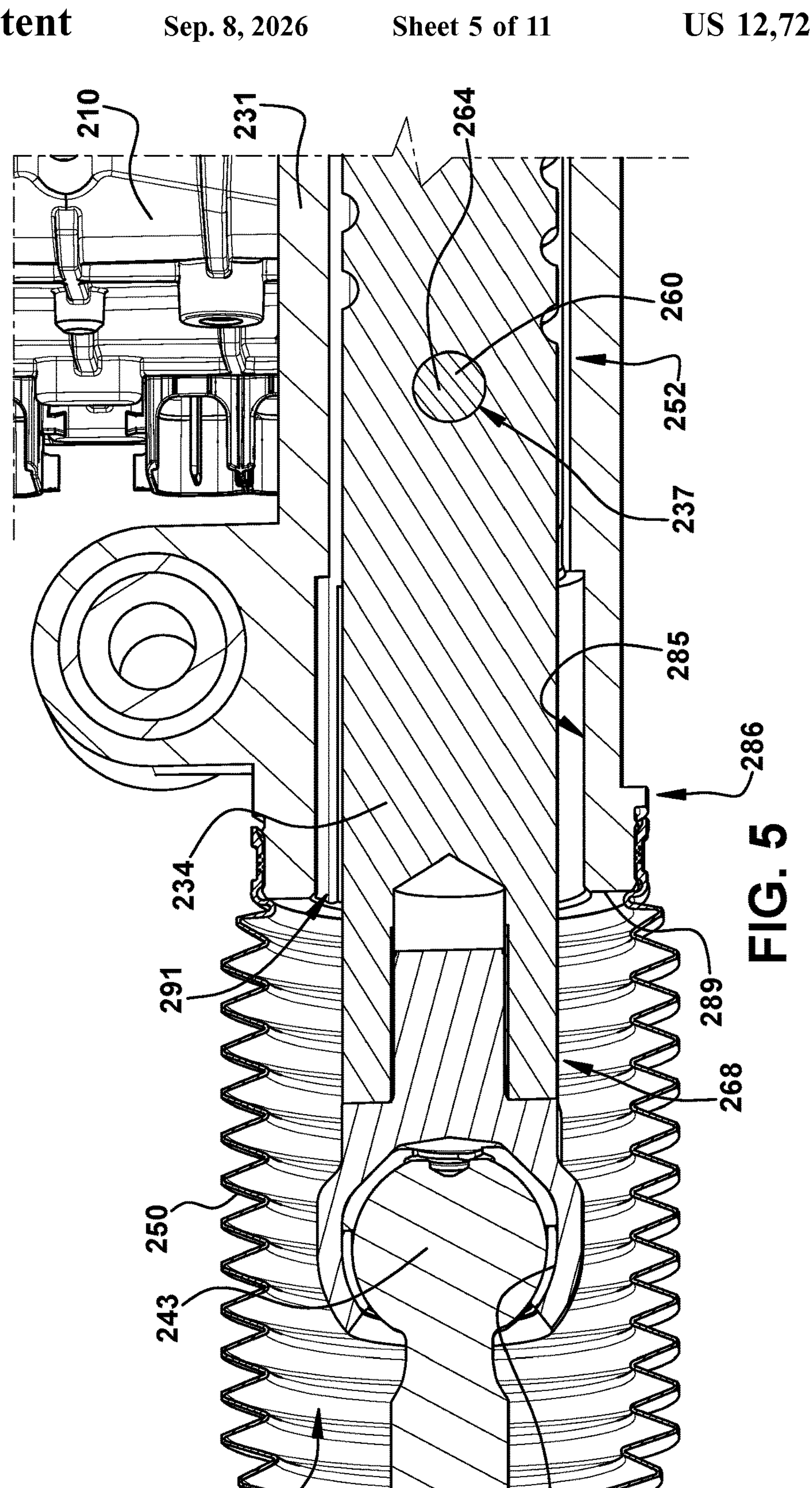
FIG. 5 is a perspective, section view of a ball joint of the steering system of FIG. 2.
Figure 6:
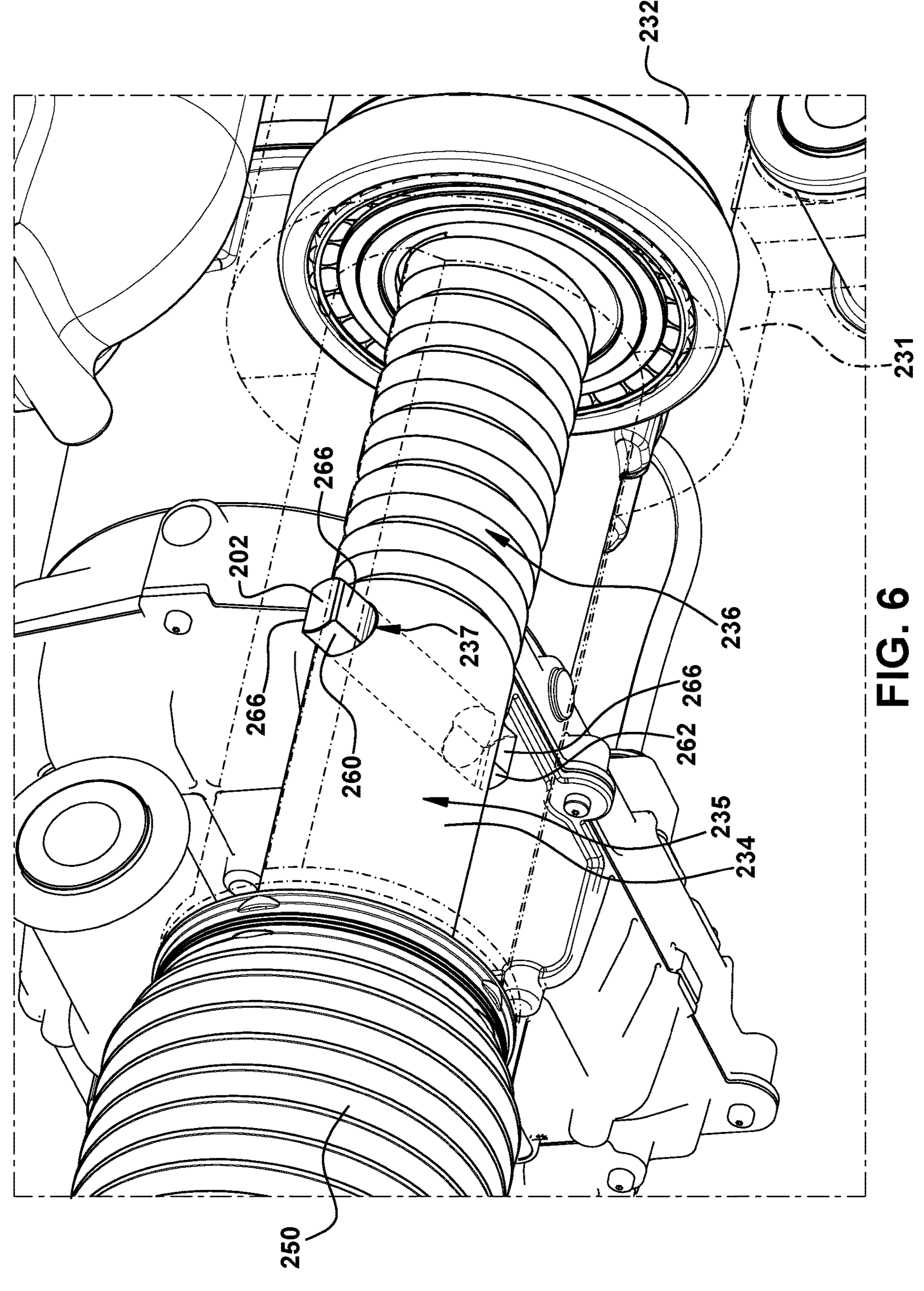
FIG. 6 is a perspective view of the ball shaft engaged with a housing of the steering system of FIG. 2.

The ball joints 240 may be mounted to the ball shaft 234 at opposite end portions of the ball shaft 234. The ball joints 240 may be configured to allow free rotation in two planes while limiting translation in any direction. As shown in FIGS. 3 and 5, each ball joint 240 may include a bearing stud 242 and a socket 244. The bearing stud 242 may include a spherical end 243 received within the socket 244, and the bearing stud 242 may rotate relative to the socket 244 in two planes while being prevented from translating away from the socket 244. One of the bearing stud 242 and the socket 244 may be mounted to the ball shaft 234, and the other of the bearing stud 242 and the socket 244 may be mounted to the tie rod 202. In the example embodiment shown in FIGS. 3 and 5, the socket 244 is mounted (e.g., threaded, welded, adhered, riveted, etc.) to the ball shaft 234 and the bearing stud 242 is mounted to the tie rod 202; however, it will be understood that such mounting arrangement may be reversed in alternative example embodiments.

Turning back to FIGS. 2-3, the electric power steering system 200 may further include a pair of bellows or boots 250. Each boot 250 may be mounted over a respective one of the ball joints 240. The boots 250 may protect the ball shaft 234 and the ball joints 240 and limit moisture, dust and other debris from negatively affecting operation of the ball shaft 234 and the ball joints 240. One end of the boots 250 may be fixed to a housing 231 of the ball-screw assembly 230, and the opposite end of the boots 250 may be mounted to the tie rods 202. Each boot 250 may deform (e.g., expand and contract) when a corresponding tie rod 202 pivots relative to the ball shaft 234 and when the ball shaft 234 translates to rotate the knuckles via the tie rods 202 and turn the front wheels 101 of the vehicle 100.

Figure 4:
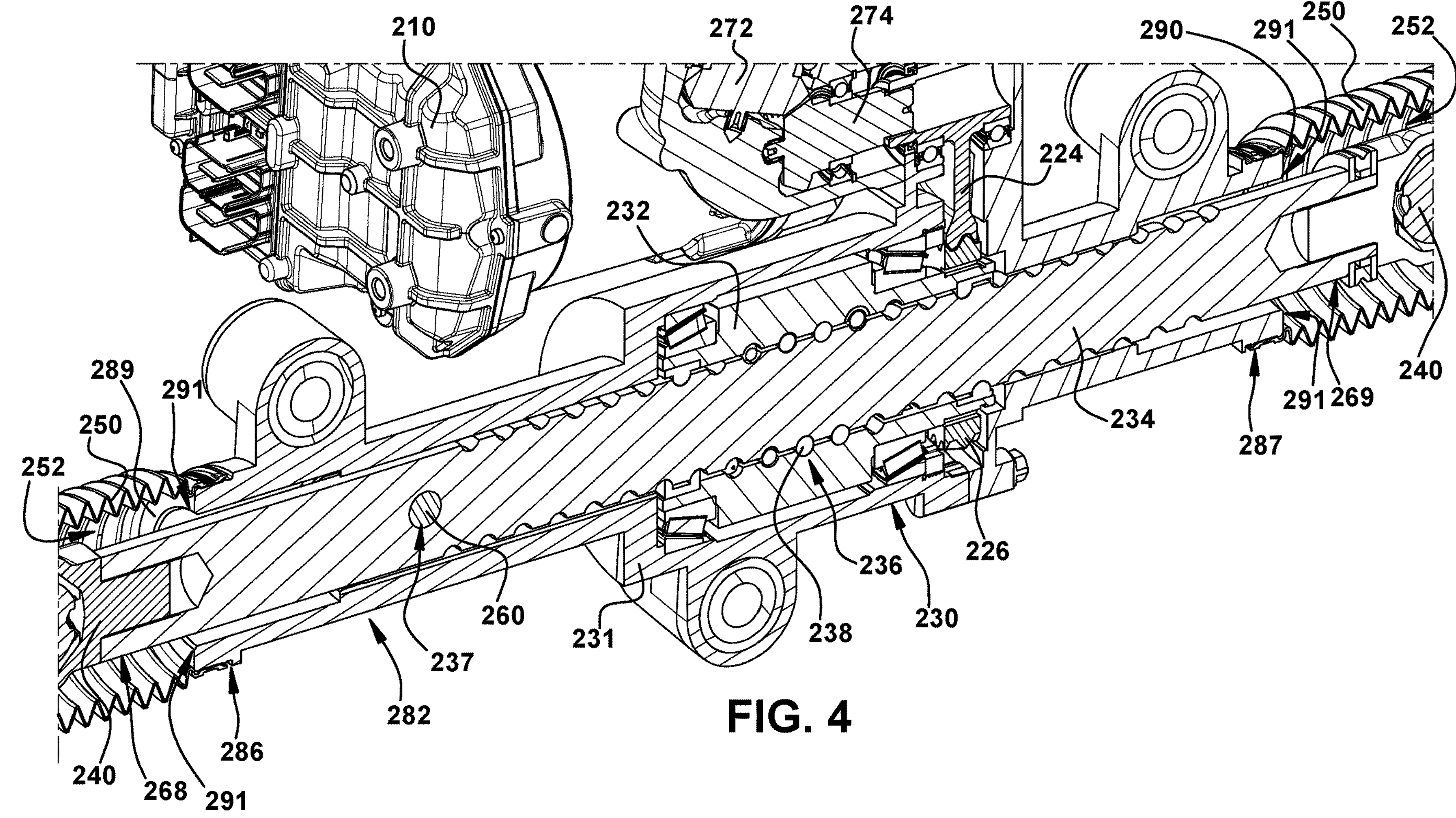
FIG. 4 is a perspective, section view of a ball shaft of the steering system of FIG. 2.

Turning now to FIG. 4, the ball-screw assembly 230 includes a ball nut 232 and a ball shaft 234. The ball shaft 234 may be received within the ball nut 232. The ball nut 232 and the ball shaft 234 may collectively define a helical track 236. For instance, the ball shaft 234 may define a portion of the helical track 236 at an outer surface 235 of the ball shaft 234, and the ball nut 232 may define the other portion of the helical track 236 at an inner surface of the ball nut 232. The portion of the helical track 236 defined by the ball shaft 234 may be axially between first and second end portions 268, 269 of the ball shaft 234. The portion of the helical track 236 defined by the ball shaft 234 may also face the portion of the helical track 236 defined by the ball nut 232 such that the helical track 236 is formed radially between the ball nut 232 and the ball shaft 234.

The ball nut 232 is rotatable relative to the ball shaft 234. For instance, the ball nut 232 may be rotatably mounted within the housing 231, e.g., on tapered roller bearings, and the gearset 220 may couple the electric motor 210 and the ball nut 232 such that the electric motor 210 is operable to rotate the ball nut 232 relative to the ball shaft 234. During rotation of the ball nut 232 relative to the ball shaft 234, the ball shaft 234 may also translate relative to the ball nut 232. In particular, a plurality of bearings 238, such as spherical ball bearings, may be disposed within the helical track 236. The bearings 238 are circulatable through the helical track 236, and the bearings 238 may drive translation of the ball shaft 234 relative to the ball nut 232 during rotation of the ball nut 232 relative to the ball shaft 234. The bearings 238 may recirculate through the helical track 236 within a closed loop.

In certain example embodiments, a length of the ball shaft 234 may be no less than three hundred millimeters (300 mm) and no greater than nine hundred millimeters (900 mm), such as about seven hundred and twenty-five millimeters (725 mm). Such sizing of the ball shaft 234 may advantageously provide an axially compact ball-screw assembly 230 while also sizing the ball shaft 234 for translation in order to rotate knuckles via the tie rods 202 and turn the front wheels 101 of the vehicle 100. Moreover, the ball-screw assembly 230 may be more axially compact than known rack-and-pinion assemblies for front steering systems.

Turning to FIGS. 5-10, the ball-screw assembly 230 may also include features for limiting or preventing rotation of the ball shaft 234 relative to the housing 231. For example, the ball shaft 234 may include an opening 237 extending entirely laterally through the diameter of the ball shaft 234. The opening 237 thus extends transversely and/or perpendicularly to both an axial length of the ball shaft 234 and the direction of translational movement of the ball shaft 234. As shown, the opening 237 may be at or adjacent to the first end portion 268, though, in certain example embodiments, the opening 237 and the ball-screw assembly 230 may configured such that the opening 237 is at or adjacent to the second end portion 269 of the ball shaft 234. Furthermore, while the opening 237 is shown as being spaced from the portion of the helical track 236 defined by the ball shaft 234, the opening 237, in certain embodiments, may at least partially overlap the portion of the helical track 236 defined by the ball shaft 234.

A pin 260 is separate from and configured to be inserted laterally into the opening 237. The pin 260 may include opposing pin ends 262 that are separated from one another by a cylindrical pin body 264. The pin ends 262 may each include opposing contact faces 266. Each contact face 266 may be a substantially flat, cut-out portion of the pin 260 such that a distance between the opposing contact faces 266 at each pin end 262 is less than a diameter of the pin body 264. However, in certain example embodiments, the flat cut-out portions may be omitted and the pin 260 may be substantially cylindrical along its entire lateral length.

When the pin 260 is seated in the opening 237, the pin body 264 is substantially located in the opening 237 and the pin ends 262 extend out from opposite ends of the opening 237. Therefore, while the pin 260 has a total lateral length that is longer than that of the opening 237, the lateral length of the pin body 264 is substantially equal to the lateral length of the opening 237. However, in certain example embodiments, a portion of the pin body 264 may extend out from the opening 237 and/or a portion of one or both of the pin ends 262 may be located in the opening 237 when the pin 260 is received in the opening 237.

The diameter of the pin body 264 may be substantially equal to or slightly less than the diameter of the opening 237. The pin body 264 and the opening 237 thus may be configured so that a press-fit and/or frictional engagement is created between the pin body 264 and the opening 237 when the pin body 264 is in the opening 237. The press-fit and/or frictional engagement between the pin body 264 and the opening 237 may help prevent the pin body 264 from being undesirably removed from the opening 237. Alternatively, the diameter of the pin body 264 may be less (e.g., slightly less) than the diameter of the opening 237 such that the pin body 264 may be at least slightly loosely fit within the opening 237. Such a loose fit provides a manufacturer with some play between the pin 260 and the ball shaft 234 when assembling the electric power steering system 200. Regardless of the tightness of the fit between the pin 260 and the ball shaft 234, the pin 260, once inserted into the opening 237, is substantially prevented from rotating about an axis SA of the ball shaft 234 relative to the ball shaft 234.

Figure 11:
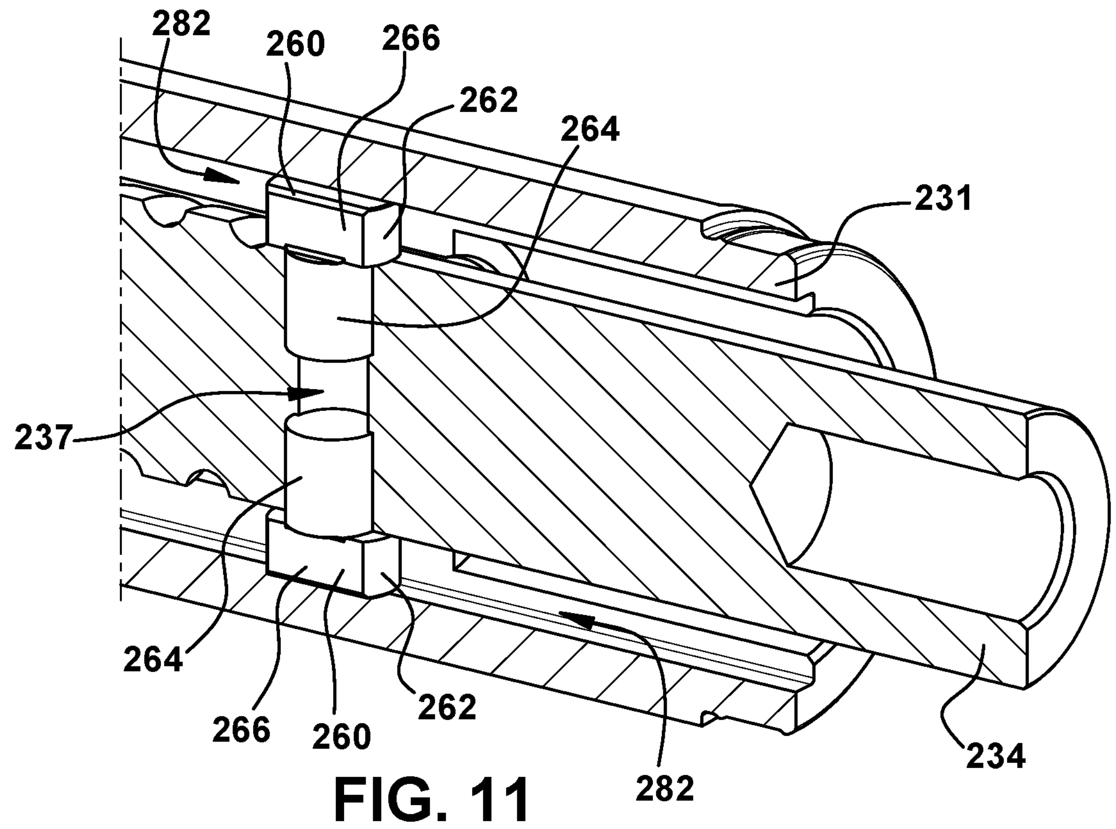
FIG. 11 is a perspective view of another example configuration of pin of FIG. 8.

Although the pin body 264 has been shown and described as extending substantially entirely through the opening 237, the pin may be configured such that the pin body 264 extends only partially through the opening 237. For example, as shown in FIG. 11, the pin body 264 may have an axial length that is half or less than half of the axial length of the opening 237. Because the smaller pin body 264 is not long enough to extend through the entire length of the opening 237, the pin 260 of FIG. 11 has only one pin end 262 that projects out from the opening 237 and includes the contact faces 266. The one pin end 262 may, in at least one dimension, be larger than the diameter of the opening 237 so that at least a portion of the pin end 262 desirably remains outside of the opening 237 when the pin 260 is joined to the ball shaft 234. For example, an axial length of the pin end 262 may be greater than the diameters of the pin body 264 and the opening 237 so that the pin end 262 is prevented from entering the opening 237. When the pin 260 is configured as shown in FIG. 11, the ball-screw assembly 230 may include an identical (or at least partially similar) second pin 260 inserted into an opposite end of the opening 237.

Returning to FIGS. 5-10, the housing 231 may define a plurality of slots 282. The housing 231 may have a lateral bulge 283 aligned circumferentially with each of the slots 282. The lateral bulges 283 may serve to help structurally reinforce the portions of the housing 231 that include the slots 282. An axial length of the slots 282 may be set as a function of a maximum distance the ball shaft 234 can travel in either direction during a translational movement.

The slots 282 may be shaped complementary to the pin ends 262 and may be opposite one another along an inner circumferential surface 285 of the housing 231 such that each pin end 262 may be received within a respective one of the slots 282. The contact faces 266 of the received pin 260 may directly contact or be slightly spaced circumferentially from corresponding counter-contact faces 284 of the slots 282. In either case, the fit of the pin ends 262 within the slots 282 is such that the pin ends 262 may slide along the slots 282 during the translation of the ball shaft 234. Furthermore, the pin ends 262 being positioned within the slots 282 may help prevent the pin 260 from undesirably egressing from the opening 237, especially, but not exclusively, when the pin body 264 is loosely fit within the opening 237.

The counter-contact faces 284, like the contact faces 266, may be substantially flat such that the interface between the counter-contact faces 284 and the contact faces 266 is robust and relatively smooth. Such an interface allows the pin ends 262 to slide along the slots 282 during the translation of the ball shaft 234, while also reducing wear between the counter-contact faces 284 and the contact faces 266.

The pin 260 thus may be engaged to the housing 231 via the pin ends 262 projecting into the slots 282. This engagement may be such that rotation of the pin 260 relative to the housing 231 is limited or prevented, which in turn limits or prevents the rotation of the ball shaft 234 relative to the housing 231. In particular, the ball nut 232, when rotated, applies a torque to the ball shaft 234 that urges the ball shaft 234 to rotate about its longitudinal axis relative to the housing 231. In conventional rack-and-pinion steering systems, a pinion meshingly engaged to the ball shaft substantially prevents the ball shaft from rotating so that the ball nut applied torque instead causes the translate relative to the ball shaft. The electric power steering system 200 of the present disclosure, including no such rack-and-pinion engagement, instead utilizes the pin 260 to limit or prevent the rotation of the ball shaft 234. Therefore, when the ball shaft 234 is urged to rotate, the contact faces 266 of the pin 260 are driven into or further into contact with the counter-contact faces 284 of the slots 282. This contact limits or prevents the rotation of the pin 260, which in turn limits or prevents the rotation of the ball shaft 234 rotationally fixed thereto.

Although the pin 260 prevents the ball shaft 234 from rotating, the pin 260, being slidable along the slots 282, still allows the translation of the ball shaft 234 relative to the housing 231. Accordingly, instead of rotating relative to the housing 231 in response to the ball nut applied torque, the ball shaft 234 correctly translates relative to the housing 231.

Figure 12:
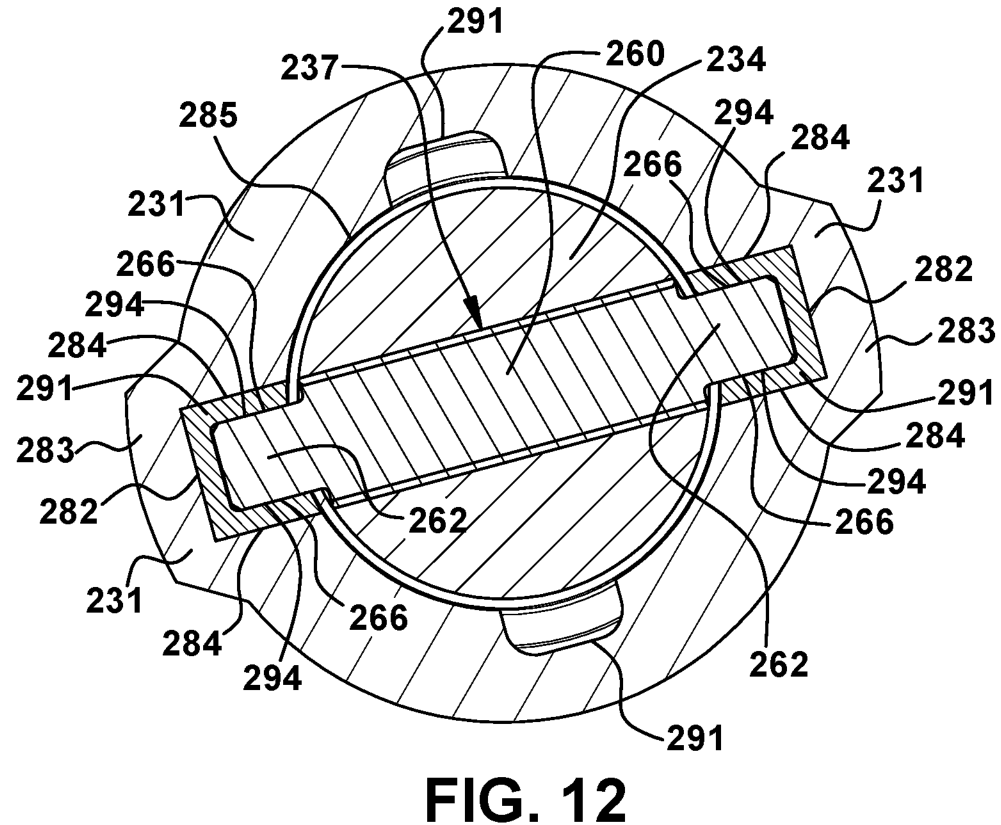
FIG. 12 is a cross-sectional view of another example configuration of the portion of the steering system of FIG. 10.

Although pin 260 has been shown as directly engaging/contacting the housing 231 in the slots 282, the ball-screw assembly 230 may be configured such that the pin 260 indirectly engages/contacts the housing 231 in the slots 282. For example, as shown in FIG. 12, an intermediate element 293 (e.g., a liner or bushing) may be inserted into each slot 282 and welded, bolted, press-fit, or otherwise maintained in the slots 282. The intermediate elements 293 are positioned between the pin ends 262 and the housing 231 such that the pin 260 indirectly engages the housing 231 via the intermediate elements 293. The intermediate elements 293 may be formed from a material having a higher contact strength than that of the housing 231. For example, the housing 231 may be formed at least partially from cast iron, while the intermediate elements 293 may be formed at least partially from steel. The intermediate elements 293 thus may help structurally reinforce the housing 231 at the slots 282.

The intermediate elements 293 may overlie (e.g., directly contact) at least the counter-contact faces 284 of the slots 282 and define their own counter-contact faces 294. The contact faces 266 of the pin ends 262 thus may directly contact or be slightly spaced circumferentially from corresponding counter-contact faces 294 of the intermediate portions 293. The contact faces 266 of the pin 260 thus are driven into or further into direct contact with the counter-contact faces 294 of the intermediate elements 293 when the ball shaft 234 is urged to rotate. This contact limits or prevents the rotation of the pin 260 and the ball shaft 234. The counter-contact faces 294 of the intermediate elements 293, just like the counter-contact faces 284 of the slots 282, may also be substantial flat and/or may permit the pin ends 262 to slide thereon during a translation movement of the ball shaft 234. The intermediate elements 293, when provided, thus structurally reinforce the slots 282 without significantly changing the functionality of the ball-screw assembly 230.

As shown in FIGS. 4-5 and 9-10, the slots 282 may be positioned at an end of the housing 231. For example, the housing 231 may extend between a first end portion 286 and a second end portion 287. The slots 282 may be positioned at the first end portion 286 of the housing 231 and extend from an edge 289 of the housing 231 toward the second end portion 289. Thus, friction between the ball shaft/pin 234/260 combination and the housing 231 at the pin ends 262 within the slots 282 may be limited to a small portion of the length of the ball shaft 234 in certain example embodiments. A third gearwheel 226, which couples the gearset 220 to the ball nut 232, may be positioned at the second end portion 287 of the housing 231. Thus, e.g., the slots 282 and the third gearwheel 226 may be axially spaced apart and/or positioned at opposite end portions of the housing 231.

During translation of the ball shaft 234, the ends 268, 269 of the ball shaft 234 may extend and retract relative to the housing 231 of the ball-screw assembly 230. Moreover, one end 268, 269 of the ball shaft 234 may extend away from the housing 231, and the opposite end 268, 269 of the ball shaft 234 may retract towards the housing 231. Such movement of the ball shaft 234 may also deform the boots 250. For instance, the boot 250 at the end 268, 269 of the ball shaft 234 extending away from the housing 231 may expand, and the boot 250 at the end 268, 269 of the ball shaft 234 retracting towards the housing 231 may contract. Such expansion and contraction of the boots 250 may change the pressure of air within the boots 250. Thus, the electric power steering system 200 may include features for balancing air pressure within the boots 250.

For example, in certain example embodiment, the housing 231 may include one or more vent slots 291 extending from one or both edges 289, 290 of the housing 231. Each vent slot 291 may extend partially or entirely from one edge 289, 290 toward/to the other edge 289, 290. Each vent slot 291 is in fluid communication with an interior 252 of an adjacent boot 250 and allows air to enter and exit the boot 250 to balance the air pressure within the boot 250. The one or more vent slots 291 may also permit the transfer of air between the boots 250 to balance the air pressure between the boots 250.

As noted above, the gearset 220 may couple the electric motor 210 and the ball nut 232, and the electric motor 210 may be operable to rotate the ball nut 232 relative to the ball shaft 234 via the gearset 220. Turning now to FIGS. 13, 13A and 14, as shown, the gearset 220 may include a first gearwheel 222, a second gearwheel 224, and the third gearwheel 226. The first gearwheel 222, the second gearwheel 224, and the third gearwheel 226 may collectively form a portion of a power flow path between the electric motor 210 and the ball nut 232.

The first gearwheel 222 may be coupled to a rotor 211 of the electric motor 210. For instance, the first gearwheel 222 may be coupled to the rotor 211 of the electric motor 210 via a planetary gear set 214, as described in greater detail below, and the third gearwheel 226 may be coupled to the ball nut 232. The third gearwheel 226 may be fixed relative to the ball nut 232. In certain example embodiments, the third gearwheel 226 may be separately formed and mounted to the ball nut 232, e.g., via spline toothing. In other example embodiments, the third gearwheel 226 may be integrally formed with the ball nut 232, e.g., such that the third gearwheel 226 is formed on the ball nut 232. For example, the ball nut 232 may be milled, ground, hobbed, shaped, or otherwise suitable machined to form the third gearwheel 226. The second gearwheel 224 may be disposed between the first and third gearwheels 222, 226 in the power flow path of the gearset 220. For example, the second gearwheel 224 may be meshed with the first and third gearwheels 222, 226.

The planetary gear set 214 may be disposed in power flow between the electric motor 210 and the gearset 220. Thus, e.g., the planetary gear set 214 may be configured for transferring rotation of the electric motor 210 to the gearset 220. The planetary gear set 214 may include a sun gear 215, a plurality of planet gears 216, a planet carrier 217, and a ring gear 218 (FIG. 13A). The planet gears 216 are meshed with both the sun gear 215 and the ring gear 218. Thus, e.g., the planet gears 216 may be positioned between the sun gear 215 and the ring gear 218 within the planetary gear set 214. It will be understood that, while the planetary gear set 214 has one set of the planet gears 216 and is thus a negative or minus planetary gear set in the illustrated example embodiment, the planetary gear set 214 may include an additional set of planetary gears and thus be a positive or plus planetary gear set in alternative example embodiments.

One of the sun gear 215, the planet carrier 217 and the ring gear 218 of the planetary gear set 214 may be connected to and be rotatable with the rotor 211 of the electric motor 210. Thus, e.g., the one of the sun gear 215, the planet carrier 217 and the ring gear 218 of the planetary gear set 214 may correspond to an input of the planetary gear set 214 during operation of the electric motor 210 when windings within the electric motor 210 drive rotation of the rotor 211. Moreover, the one of the sun gear 215, the planet carrier 134 and the ring gear 218 of the planetary gear set 214 may rotate when windings within the electric motor 210 drive rotation of the rotor 211. In certain example embodiments, the sun gear 215 is connected to and rotatable with the rotor 211. For instance, the sun gear 215 may be integrally formed with the rotor 211, e.g., such that the teeth of the sun gear 215 are formed on the rotor 211. For example, an end of the rotor 211 may be milled, ground, hobbed, shaped, or otherwise suitable machined to form the sun gear 215 on the rotor 211. Alternatively, the sun gear 215 may be separately formed and subsequently connected to the rotor 211, e.g., directly onto the rotor 211 or with one or more intervening elements, such as a shaft.

Another one of the sun gear 215, the planet carrier 217 and the ring gear 218 of the planetary gear set 214 (e.g., other than the one of the sun gear 215, the planet carrier 217 and the ring gear 218 connected to and rotatable with the rotor 211) may be connected to and be rotatable with the first gearwheel 222 of the gearset 220. Thus, e.g., another one of the sun gear 215, the planet carrier 217 and the ring gear 218 of the planetary gear set 214 may correspond to an output of the planetary gear set 214 during operation of the electric motor 210, and the first gearwheel 222 may correspond to an input for the gearset 220 during operation of the electric motor 210. Moreover, the other one of the sun gear 215, the planet carrier 217 and the ring gear 218 of the planetary gear set 214 connected to the first gearwheel 222 may rotate when windings within the electric motor 210 drive rotation of the rotor 211. In certain example embodiments, the planet carrier 217 is connected to and rotatable with the first gearwheel 222. For instance, the planet carrier 217 may be connected to the first gearwheel 222, e.g., directly or via a suitable shaft or other intermediate components.

The planetary gear set 214 may be configured to provide a reduction between the electric motor 210 and the gearset 220. For example, a gear ratio of the planetary gear set 214 may be no less than 7.5:1 and no greater than 8.5:1, such as about 8:1. Thus, the planetary gear set 214 may provide mechanical advantage between the electrical motor 210 and the gearset 220. The gearset 220 may also be configured to provide a reduction between the planetary gear set 214 and the ball-screw assembly 230. For example, a gear ratio of the gearset 220 may be no less than 1:1 and no greater than 2:1, such as about 1.5:1. Thus, the gearset 220 may provide mechanical advantage between the planetary gear set 214 and the ball-screw assembly 230. To provide such mechanical advantage, a root diameter of the second gearwheel 224 may be greater than a root diameter of the third gearwheel 226, and the root diameter of the third gearwheel 226 may be greater than the root diameter of the first gearwheel 222.

Figures 7, 8:
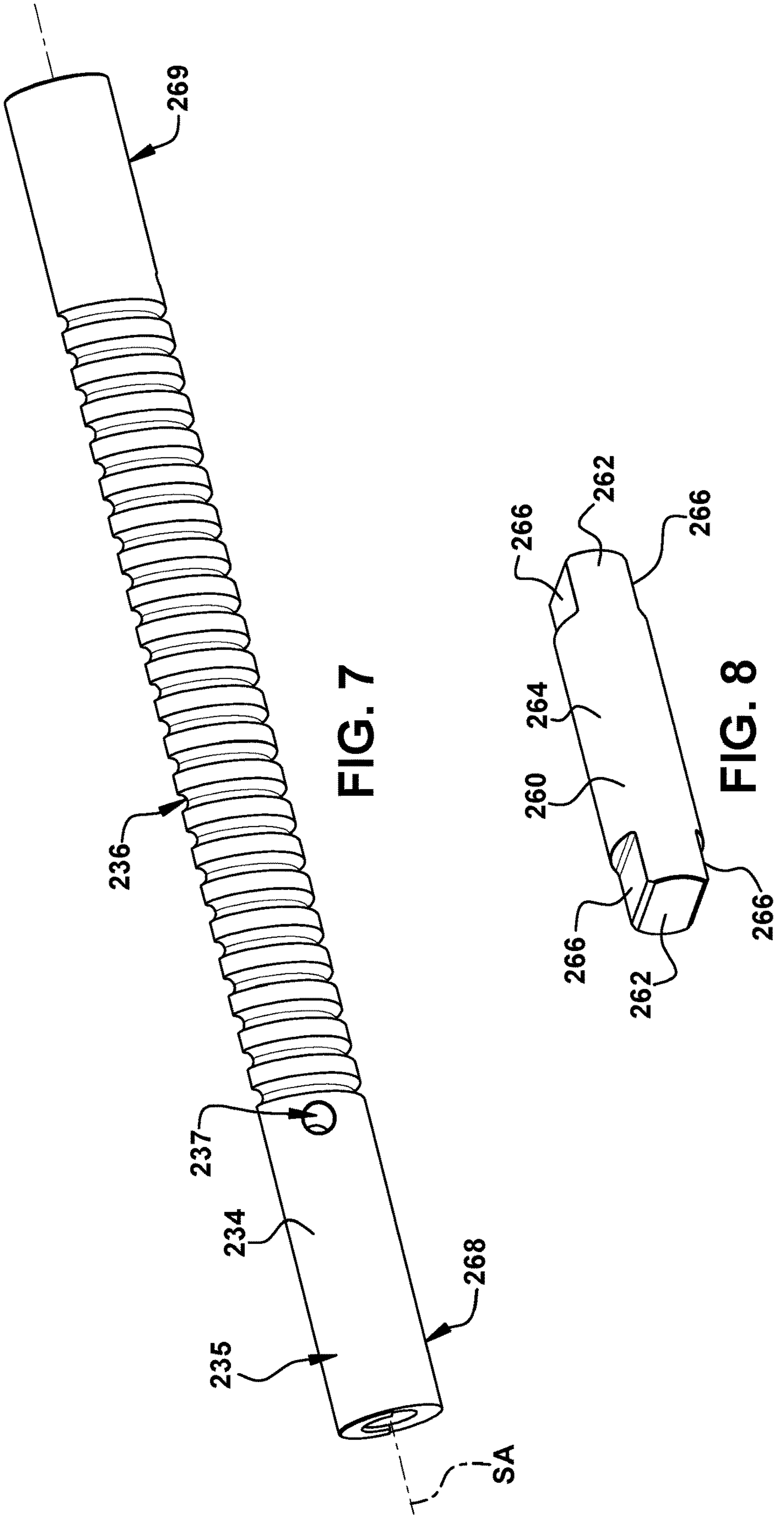
FIG. 7 is a perspective view of the ball shaft of the steering system of FIG. 2.
FIG. 8 is a perspective view of a pin of the steering system of FIG. 2.
Figure 9:
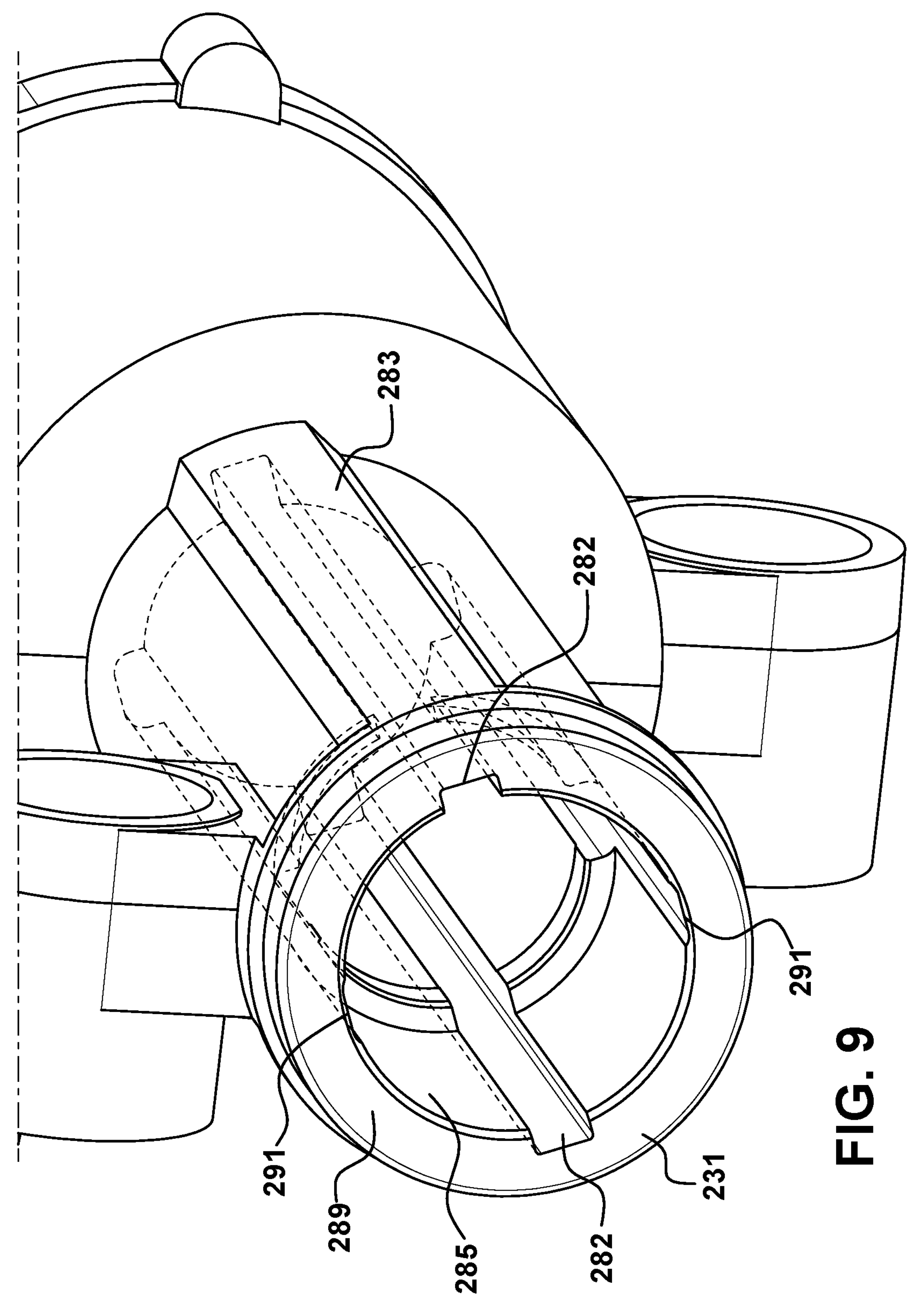
FIG. 9 is a perspective view of a portion of a housing of the steering system of FIG. 2.
Figure 10:
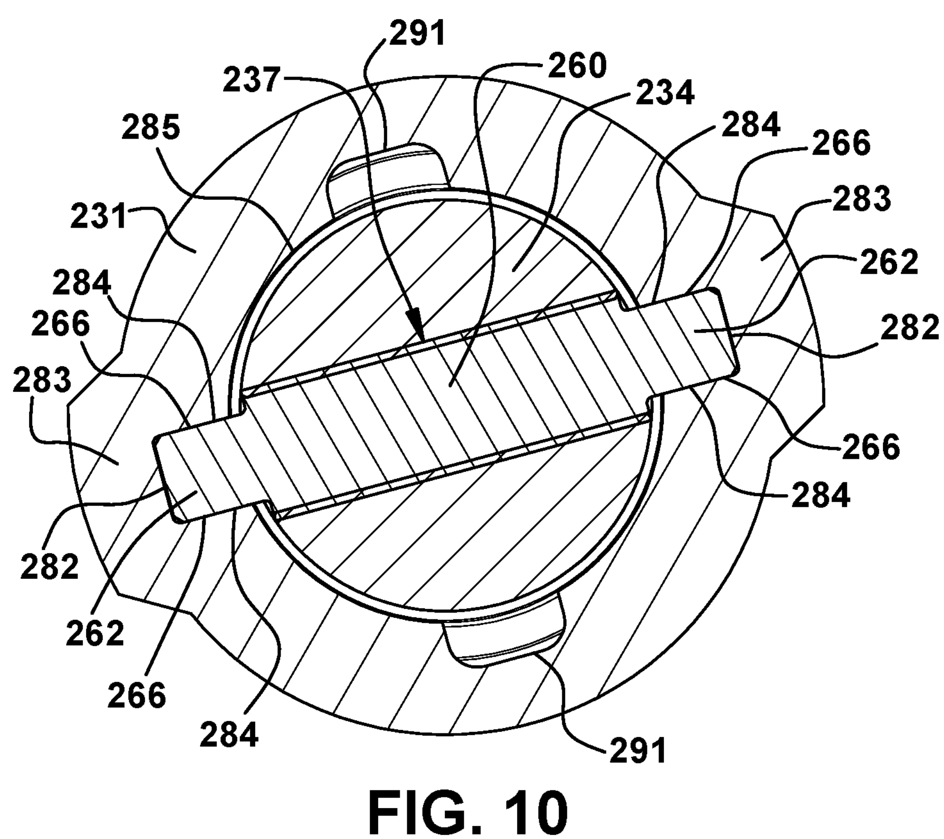
FIG. 10 is a cross-sectional view of a portion of the steering system of FIG. 2.

Turning now to FIGS. 3-4 and 8, the electric power steering system 200 may include a bevel gearbox 270. An input 276 of the bevel gearbox 270 may be connectable to the steering column 120 (FIG. 1). An output 278 of the bevel gearbox 270 may be connected to the second gearwheel 224 of the gearset 220. The bevel gearbox 270 may include a first bevel gear 272 and a second bevel gear 274. The first bevel gear 272 may be meshed with the second bevel gear 274. The first bevel gear 272 may be connectable to the steering column 120 at the input 276 of the bevel gearbox 270, and the second bevel gear 274 may be connected to the second gearwheel 224 of the gearset 220 at the output 278 of the bevel gearbox 270. Thus, the bevel gearbox 270 may couple the steering column 120 to the gearset 220. Moreover, the bevel gearbox 270 may transfer rotation of the steering column 120 to the gearset 220 and thus to the ball-screw assembly 230 while also changing an angle of such rotation. In certain example embodiments, a gear ratio of the bevel gearbox 270 may be no less than 0.25:1 and no greater than 0.75:1, such as about 0.5:1.

As shown in FIGS. 2-3, the ball-screw assembly 230, the electric motor 210 and the bevel gearbox 270 may be positioned on the same axial side of the gearset 220. Such arrangement of the ball-screw assembly 230, the electric motor 210 and the bevel gearbox 270 may advantageously provide an axially compact electric power steering system 200. Moreover, the electric power steering system 200 may be more axially compact than known rack-and-pinion assemblies for front steering systems.

The planetary gear set 214, the gearset 220 and the ball-screw assembly 230 may cooperate and be configured to provide a mechanical advantage for the electric motor 210, e.g., to allow the electric motor 210 to supplement driver torque in order to facilitate turning of the wheels 101 of the vehicle 100, as described in greater detail below.

The bevel gearbox 270 may be coupled to the steering wheel 118 of the vehicle 100. For instance, the steering wheel 118 may be coupled to the second gearwheel 224 via the steering column 120 of the vehicle 100 that extends between and connects the steering wheel 118 to the first bevel gear 272 at the input 276 of the bevel gearbox 270, and a driver of the vehicle 100 may turn the steering wheel 118 to rotate the first bevel gear 272 via the steering column 120 that transfers rotation of steering the wheel 118 to the first bevel gear 272. Due to the meshing of the first and second bevel gears 272, 274, the rotation of the steering column 120 is transferred to the second bevel gear 274 at the output 278 of the bevel gearbox 270. Within the electric power steering system 200, the output 278 of the bevel gearbox 270 is coupled to the second gearwheel 224 of the gearset 220 such that the rotation of the second bevel gear 274 is transferred to the gearset 220.

The electric power steering system 200 includes features for supplementing the torque applied by the driver to the steering column 120 by turning the steering wheel 118, e.g., in order to make steering of the vehicle 100 easier for the driver. In particular, the electric motor 210 is operable to drive rotation of the ball nut 232, e.g., to supplement the torque applied by the driver to the second gearwheel 224 of the gearset 220 by turning the steering wheel 118. As noted above, the electric motor 210 may be coupled to the ball nut 232 via the planetary gear set 214 and the gearset 220, e.g., such that rotation of the electric motor 210 may drive rotation of the ball nut 232 via the planetary gear set 214 and the gearset 220. For instance, the electric motor 210 may operate to rotate the rotor 211, and a first one of the components of the planetary gear set 214 (e.g., the sun gear 215) may rotate during operation of the electric motor 210. The rotation of the first one of the components of the planetary gear set 214 (e.g., the sun gear 215) may drive rotation of a second one of the components of the planetary gear set 214 (e.g., the planet carrier 217). Due to the coupling of the second one of the components of the planetary gear set 214 (e.g., the planet carrier 217) to the first gearwheel 222 of the gearset 220, the planetary gear set 214 may transfer rotation of the electric motor 210 to the gearset 220 such that the first gearwheel 222 rotates during operation of the electric motor 210. In turn, the second gearwheel 224 may transfer the rotation of the first gearwheel 222 to the third gearwheel 226 within the gearset 220, and the ball nut 232 may rotate due to the connection of the third gearwheel 226 to the ball nut 232. Accordingly, the ball nut 232 may rotate during operation of the electric motor 210, e.g., with a mechanical advantage for the electric motor 210 provided by the planetary gear set 214 and the gearset 220.

During rotation of the ball nut 232 relative to the ball shaft 234, the ball shaft 234 may also translate relative to the ball nut 232. Thus, the ball-screw assembly 230 may convert the rotary motion of the electric motor 210 to translate the tie rods 202 coupled to the ball shaft 234. Moreover, translation of the ball shaft 234 may rotate the knuckles via the tie rods 202 and turn the front wheels 101 of the vehicle 100. Thus, when a driver rotates the steering wheel 118 and/or when the electric motor 210 operates to rotate the ball nut 232, the ball-screw assembly 230 may translate the ball shaft 234 in order to rotate the knuckles via the tie rods 202 and turn the front wheels 101 of the vehicle 100.

To control operation of the electrical motor 210, the electric power steering system 200 may include a controller and/or a power steering sensor 292. The controller may include a memory and microprocessor, such as a general or special purpose microprocessor operable to execute programming instructions or micro-control code associated with operation of the electric power steering system 200. The memory may represent random access memory such as DRAM, or read only memory such as ROM or FLASH. In one embodiment, the processor executes programming instructions stored in memory. The memory may be a separate component from the processor or may be included onboard within the processor. Alternatively, the controller may be constructed without using a microprocessor, e.g., using a combination of discrete analog and/or digital logic circuitry (such as switches, amplifiers, integrators, comparators, flip-flops. AND gates, and the like) to perform control functionality instead of relying upon software. The electric motor 210 and the power steering sensor 292 may be in communication with the controller via one or more signal lines or shared communication busses. The controller may also communication with other systems within the vehicle 100 via a controller area network (CAN) bus.

The power steering sensor 292 may be configured for detecting a steering torque and/or angle of the steering column 120. In response to inputs from the power steering sensor 292, the controller may operate the electric motor 210 to drive rotation of the ball nut 232. Moreover, the power steering sensor 292 may detect a driver of the vehicle 100 turning the steering wheel 118, and the controller may activate the electric motor 210 to supplement driver torque applied at the second gearwheel 224 in order to facilitate turning of the wheels 101 of the vehicle 100. Further, the power steering sensor 292 may detect the direction and the degree to which the driver turns the steering wheel 118, and the controller may operate the electric motor 210 to drive the rotor 211 a certain number of rotations in a certain direction, both of which complement detected direction and degree from the power steering sensor 292.

As may be seen from the above, the electric power steering system 200 includes components (e.g., the planetary gear set 214, the gearset 220 and the ball-screw assembly 230) for mechanical reduction between the electrical motor 210 and/or the steering wheel 118 and the ball shaft 234, e.g., to convert the low torque and high speed of the electric motor 210 into useful higher torque and low speed to effectively steer a heavy commercial vehicle.

From the above description of the invention, those skilled in the art will perceive improvements, changes and modifications. Such improvements, changes and modifications within the skill of the art are intended to be covered by the appended claims.

Having described the invention, the following is claimed:

1. A steering system, comprising:

a housing;

a ball shaft translatable relative to the housing, the ball shaft having first and second opposite end portions configured to be coupled to wheels of a vehicle to turn the wheels of the vehicle when the ball shaft translates relative to the housing, the ball shaft having an opening extending therethrough;

a ball nut rotatably mounted within the housing, rotation of the ball nut responsively causing the ball shaft to translate relative to the ball nut and the housing; and a pin separate from the ball shaft and inserted into the opening, the pin engaging the housing to limit rotation of the ball shaft relative to the housing.

2. The assembly of claim 1, wherein the rotational limitation is such that the ball shaft is substantially prevented from rotating relative to the housing.

3. The steering system of claim 1, wherein the opening extends in a direction transverse to a translation direction of the ball shaft.

4. The steering system of claim 1, wherein the ball nut and ball shaft collectively define a helical track, the assembly further comprising a plurality of bearings circulatable through the helical track when the ball nut rotates relative to the ball shaft to translate the ball shaft relative to the ball nut.

5. The steering system of claim 1, wherein the pin includes opposing pin ends separated from one another by a pin body, the pin body being in the opening, the pin ends extending out from opposite ends of the opening to engage the housing.

6. The steering system of claim 5, wherein the pin body and the opening are configured such that the pin is substantially prevented from rotating about an axis of the ball shaft relative to the ball shaft.

7. The steering system of claim 5, wherein the housing defines a plurality of slots, each pin end projecting into an associated slot.

8. The steering system of claim 7, wherein each pin end includes opposing, substantial flat contact faces that contact opposing, substantial flat counter-contact faces of the slots to limit rotation of the pin and the ball shaft relative to the housing.

9. The steering system of claim 7, further comprising an intermediate element in each slot, each intermediate element being formed from a different material than that of the housing, each intermediate element being between an associated pin end and the housing so that each pin end indirectly engages the housing via the intermediate element.

10. The steering system of claim 1, wherein the pin directly engages the housing to limit rotation of the ball shaft relative to the housing.

11. The steering system of claim 1, further comprising a second pin engaging the housing to limit rotation of the ball shaft relative to the housing, the second pin being inserted into an end of the opening that is opposite the pin.

12. The steering system of claim 11, wherein each of the pin and the second pin has a pin end that is prevented from entering the opening, each of the pin and the second pin engaging the housing at their respective pin ends.

13. The steering system of claim 1, wherein the ball nut and the ball shaft collectively defining a helical track, the steering system further comprising:

an electric motor;

a gearset coupling the electric motor and the ball nut such that the electric motor is operable to rotate the ball nut relative to the ball shaft; and a plurality of bearings circulatable through the helical track when the ball nut rotates relative to the ball shaft in order to translate the ball shaft relative to the ball nut.

14. The steering system of claim 13, wherein the housing defines a slot, the pin projecting into the slot.

15. The steering system of claim 14, wherein the housing extends between a first end portion and a second end portion, the slot being positioned at the first end portion of the housing, the gearset being coupled to the ball nut at the second end portion of the housing.

16. The steering system of claim 1, further comprising:

a pair of ball joints, each ball joint being mounted to the ball shaft at a respective end portion of the ball shaft; and a pair of boots, each boot being mounted over an associated ball joint;

wherein the housing includes a vent slot for balancing air pressure within an associated one of the boots and/or between the pair of boots.

17. A steering system, comprising:

a housing defining a slot;

a ball shaft translatable relative to the housing, the ball shaft having first and second opposite end portions configured to be coupled to wheels of a vehicle to turn the wheels of the vehicle when the ball shaft translates relative to the housing;

a ball nut rotatably mounted within the housing, rotation of the ball nut responsively causing the ball shaft to translate relative to the ball nut and the housing; and a pin separate from and joined to the ball shaft, the pin projecting into the slot to limit rotation of the ball shaft relative to the housing.

18. The assembly of claim 17, wherein the pin has a pin body inserted into the ball shaft and a pin end projecting into the slot, contact between the pin end and the housing at the slot limiting rotation of the pin and the ball shaft relative to the housing.

19. The assembly of claim 18, wherein the housing extends between a first end portion and a second end portion, the slot being at the first end portion of the housing and extending from an edge of the housing toward the second end portion of the housing.

20. The assembly of claim 17, further comprising an intermediate element in the slot between the pin and the housing, the intermediate element being formed from a different material than that of the housing.

* * * * *